United States Patent [19]

Dowrick et al.

[11] 3,912,806

[45] Oct. 14, 1975

[54] METHOD OF TREATING BOVINE MASTITIS

[75] Inventors: John Sydney Dowrick, Littlehampton; Jeffrey Lewis Marsden, Worthing, both of England

[73] Assignee: Beecham Group Limited, England

[22] Filed: May 24, 1974

[21] Appl. No.: 473,198

[30] Foreign Application Priority Data
May 24, 1973  United Kingdom............... 24915/73

[52] U.S. Cl. .................... 424/16; 424/19; 424/32; 424/33; 424/34; 424/35; 424/271
[51] Int. Cl.² . A61K 9/16; A61K 9/22; A61K 31/43
[58] Field of Search.................... 424/16, 19, 271

[56] References Cited

UNITED STATES PATENTS

| | | | |
|---|---|---|---|
| 2,805,977 | 9/1957 | Robinson et al. | 424/19 |
| 3,328,256 | 6/1967 | Gaunt | 424/19 |
| 3,576,760 | 4/1971 | Gould et al. | 424/19 |

*Primary Examiner*—Albert T. Meyers
*Assistant Examiner*—A. P. Fagelson

[57] ABSTRACT

A method of treatment of mammary disorders of animals comprising the intramammary administration during the dry period of an antibiotic together with a substantially water-insoluble and oil-insoluble binding agent in the form of granules, the binding agent constituting 5–20% of the granules.

10 Claims, No Drawings

METHOD OF TREATING BOVINE MASTITIS

This invention relates to a method for the treatment of mammary disorders in animals, especially bovine mastitis.

It is known to use antibiotics and other medicaments in the treatment and control of bovine mastitis. These have previously been administered by the intramammary route and have therefore been used in a liquid or semi-liquid form such as an ointment. In such formulations there is often little control over the rate of release of the active compound into the body of the animal. It is known that the efficiency of the treatment is partly dependent upon the duration of antibiotic activity and a controlled release is therefore desirable.

In our British Patent No. 1312918, there is claimed a method for the treatment of mammary disorders in non-human animals which comprises administering an antibacterial agent to the animal by the intramammary route during the animals dry period, said antibacterial agent being administered in the form of sustained release beadlets.

The materials used in the formation of the beadlets of that patent may be waxy substances such as carnauba wax, montan wax, beeswax, glycerides such as hydrogenated castor oil and hydrogenated lard, or fatty amides such as myristamide and stearamide. The beadlets are then usually administered in the form of a suspension in an emulsifiable oily vehicle.

Although the beadlets described in Patent No. 1312918 are superior to previously used treatments for mammary disorders, their disadvantages are difficulties in formulation due to the solubility of the waxy beadlet materials in oily vehicles.

It has now been found that these disadvantages can be overcome by granulating the antibiotic with a water insoluble non-waxy binding agent.

Accordingly the present invention provides a method for the treatment and control of mammary disorders in non-human animals which method comprises the administration of an antibacterial agent to the animal by the intramammary route during the animal's dry period, said antibacterial agent being administered together with a substantially water-insoluble and oil-insoluble binding agent in the form of granules.

The invention is especially applicable in the treatment of bovine mastitis in which the antibacterial agent may be administered directly into the mammary gland via the streak canal.

The term granule is intended to include any discrete non-tacky particle or agglomerate of particles which comprises an antibacterial agent in combination with a binding agent. The term also includes microencapsulated products. The formulation of antibacterial agents in the form of sustained release granules is well known in the art for oral administration for example (e.g. Belgian Patent No. 719,923), but it has not been suggested that such formulations were suitable for intramammary administration, where much more prolonged levels of antibacterial agent are required in the non-lactating animal.

The binding agent is a polymeric material which is:
a. substantially insoluble in water;
b. non-toxic and non-irritant; and
c. compatable with the antibacterial agent.

Examples of suitable binding agents include various plastics materials such as polyvinyl esters, polyacrylamides, silicones and shellac. A preferred binding agent is ethylcellulose.

This invention is primarily applicable in the dry-period therapy in the treatment of bovine mastitis. It would clearly be undesirable if the sustained release granules continued to release appreciable quantities of antibacterial agent in the mammary gland after the beginning of lactation, since the antibacterial agent would then appear in the milk destined eventually for human consumption. The sustained release granules should therefore be formulated in such a way that either they are milked out at the beginning of lactation or alternatively they release substantially all the antibacterial agent before the beginning of lactation. This latter method of ensuring that appreciable quantities of active agent do not appear in the milk is preferred since generally it will be a routine matter to formulate the granules accordingly. Local regulations governing the maximum permissible quantity of active agent in the milk, the duration of the cow's dry period and local husbandry practice are all factors which can readily be taken into account when formulating the granules.

The granules may be prepared by known methods. In one convenient granulation technique (after Lachman et al., "The Theory and Practice of Industrial Pharmacy", Lea & Febiger, 1970, Ch.12, p.322) the binding agent and antibacterial agent are mixed in a planetary or Z-blender, and a suitable organic solvent added to produce a mix of granulation consistency, which is meshed through a Rotary granulator. The resulting granules are oven dried and hammer milled to the required size.

An alternative method of preparing the granules for this invention is the use of a fluid bed spray granulator wherein the antibacterial agent is fluidised and a solution containing the binding agent is sprayed into the fluidised antibacterial. The operating conditions are adjusted to give the most suitable product.

Other processes for the production of the granules of the present invention include spray drying (see Lachman et al. "The Theory and Practice of Industrial Pharmacy", Lea & Febiger 1970, p.403–5), spray evaporation (low temperature spray drying, as disclosed in our co-pending British Patent Application No. 61304/70; or coacervation (see Lachman et al. "Theory and Practice of Industrial Pharmacy", 1970, p.393; and Ranney M.W., Microencapsulation Technology, 1969, Noyes Data Corporation, New Jersey, U.S.A.).

The binding agent may comprise from 1% to 50% of the granule, preferably from 5 to 20%.

In general the granules will have a size in the range $5\mu$ to $500\mu$, but this will depend on the type of granule used. For example, for granules produced by a conventional granulation technique, a preferred size range is $200-400\mu$, but for spray dried granules or microcapsules, the delayed-release characteristics suitable for the method of the present invention will be provided by smaller granules, e.g. in the range $10-200\mu$.

The granules may themselves be administered in the form of a suspension in aqueous medium or oily vehicle. An oily vehicle is preferred since if an aqueous base is employed, some of the antibacterial agent tends to be leached out of the granule on storage. One example of an oily vehicle is a arachis oil thickened with colloidal silicon dioxide and a thixotrope.

After the granules are incorporated into the oil base, the formulation is homogenised by colloid milling and filled into tubes or syringe packs of the conventional type for intramammary administration, i.e. provided with a cannula nozzle fitting such that the suspension may be extruded in the normal manner directly into the mammary gland via the streak canal.

With the formulations of the present invention it is possible to maintain antibiotic levels in the udder for a longer period than can normally be achieved with untreated antibacterial agents. The antibacterial agent may be chosen from a wide range of antibiotics and other compounds known to be effective in the treatment of mammary disorders such as bovine mastitis, especially a penicillin or a non-toxic salt or ester thereof. Examples of suitable anti-bacterial agents are cloxacillin, especially benzathine cloxacillin, flucloxacillin, and its benzathine salt, amoxycillin, ampicillin, carbenicillin, dicloxacillin, methicillin, neomycin especially the sulphate, streptomycin, novobiocin, tetracycline, chlortetracycline, oxytetracycline and salts thereof and combinations of these compounds, e.g. benzathine flucloxacillin/ampicillin trihydrate or benzathine diampicillin combination.

The following example illustrates the present invention.

EXAMPLE 1

Preparation of Granules

Benzathine cloxacillin (850g) and ethylcellulose (150g) of similar particle size were loaded into a planetary mixer and mixed to give a uniform distribution. Sufficient dichloromethane was added to give a satisfactory granulation consistency and the damp mass was then passed through a rotary granulator fitted with a No. 10 B.S. Screen. The granules were oven dried at 40°C for 6 hours, and hammer milled to obtain granules no larger than 400$\mu$.

The granules were added to a vegetable oil base and mixed before passing through a colloid mill with a wide gap setting.

EXAMPLE 2

In vivo results

Using the process described in Example 1, the following formulations were prepared and administered into the mammary gland of cows. The levels of antibiotic in the udder were measured after periods shown below

| Formulation A: | 250mg Benzathine cloxacillin (untreated) in vegetable oil base. |
|---|---|
| Formulation B: | 250mg Benzathine cloxacillin granulated using ethyl cellulose (10% of antibiotic weight) in the same base as formulation A. |

| | Mean levels of cloxacillin in udder secretion ($\mu$g/ml). | | | | |
|---|---|---|---|---|---|
| Formulation | 1 day | 4 days | 1 week | 2 weeks | 3 weeks |
| A | 28.8 | 3.0 | 1.0 | 0 | 0 |
| B | 12.4 | 12.9 | 9.0 | 3.1 | 1.0 |

| Formulation C: | 500mg Benzathine cloxacillin (untreated) in vegetable oil base. |
|---|---|
| Formulation D: | 500mg Benzathine cloxacillin granulated using ethyl cellulose (15% of antibiotic weight) in the same vegetable oil base. |

| | Mean levels of cloxacillin in udder secretion ($\mu$g/ml). | | | | |
|---|---|---|---|---|---|
| Formulation | 1 day | 4 days | 1 week | 2 weeks | 3 weeks | 4 weeks |
| C | 140 | 47.4 | 12.9 | 0 | 0 | 0 |
| D | 245 | 164 | 69.4 | 15.7 | 2.3 | 1.5 |

EXAMPLE 3

In vitro data

Short term dissolution tests using the same weight and particle size range of materials demonstrate the retardation in the rate of dissolution by the addition of polymeric binding agent.

| | % Dose Dissolved at 100 minutes |
|---|---|
| Benzathine cloxacillin 36–44 mesh | 1.22 |
| Benzathine cloxacillin granulated with 15% W/W ethylcellulose 36–44 mesh | 0.49 |

We claim:

1. A method for the treatment and control of bovine mastitis which comprises administering to a cow during the dry period, by the intramammary route, an effective amount of an antibacterial agent contained in granules of 5–500 microns in size, which are suspended in an aqueous medium or oily vehicle, said granules including 50–99% of said antibacterial agent and 1–50% of a substantially water-insoluble and oil-insoluble, non-toxic and non-irritant binding agent selected from the group consisting of ethyl cellulose, polyvinyl ester, polyacrylamide, silicone, and shellac.

2. The method of claim 1 wherein the binding agent is ethyl cellulose.

3. The method of claim 1 wherein the binding agent comprises from 5 to 20% of the granule.

4. The method of claim 1 wherein the granules have a size in the range 200–400$\mu$.

5. The method of claim 1 wherein the granules are spray dried granules or microcapsules having sizes in the range 10–200$\mu$.

6. The method of claim 1 wherein the granules are administered in the form of a suspension in an arachis oil.

7. The method of claim 1 wherein the antibacterial agent is a penicillin or a non-toxic salt or ester thereof.

8. The method of claim 7 wherein the antibacterial agent is benzathine cloxacillin.

9. The method of claim 7 wherein the antibacterial agent is amoxycillin.

10. The method of claim 7 wherein the antibacterial agent is ampicillin.

* * * * *